(12) United States Patent
Guntupalli et al.

(10) Patent No.: US 8,726,313 B2
(45) Date of Patent: May 13, 2014

(54) PREVIOUSLY AIRED EPISODE RETRIEVAL BASED ON SERIES DVR SCHEDULING

(75) Inventors: Anil Krishna Guntupalli, Irving, TX (US); Sameer Vasant Gavade, Irving, TX (US); Shafiq Kassam, Lewisville, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/453,105

(22) Filed: Apr. 23, 2012

(65) Prior Publication Data

US 2013/0283317 A1 Oct. 24, 2013

(51) Int. Cl.
*G06F 3/00* (2006.01)
*G06F 13/00* (2006.01)
*H04N 5/445* (2011.01)
*H04N 7/16* (2011.01)
*H04N 5/76* (2006.01)

(52) U.S. Cl.
USPC .................. 725/44; 725/40; 725/46; 725/58; 725/139; 386/291; 386/296

(58) Field of Classification Search
None
See application file for complete search history.

(56) References Cited

U.S. PATENT DOCUMENTS

| | | | |
|---|---|---|---|
| 7,716,714 B2 * | 5/2010 | Kortum et al. | 725/139 |
| 7,882,528 B1 * | 2/2011 | Taylor et al. | 725/58 |
| 2004/0237108 A1 * | 11/2004 | Drazin et al. | 725/56 |
| 2007/0154163 A1 * | 7/2007 | Cordray | 386/52 |
| 2010/0186036 A1 * | 7/2010 | Suh et al. | 725/40 |
| 2010/0287592 A1 * | 11/2010 | Patten et al. | 725/59 |

* cited by examiner

*Primary Examiner* — Oschta Montoya

(57) ABSTRACT

A device receives an identification of a series to schedule automatic recording of episodes that are currently airing or that will be airing in the future, receives an instruction to automatically retrieve previously aired episodes of the scheduled series based on the scheduling of the automatic recording of the episodes that are currently airing or that will be airing in the future. The device searches content, based on receipt of the instruction, to retrieve previously aired episodes of the scheduled series. The device records at least one episode of the scheduled series, and presents the recorded at least one episode of the scheduled series and the previously aired episodes of the scheduled series such that a user may select and play the at least one episode of the scheduled series or the previously aired episodes of the scheduled series.

8 Claims, 12 Drawing Sheets

PREVIOUSLY AIRED EPISODE RETRIEVAL BASED ON SERIES DVR SCHEDULING

BACKGROUND

Set-Top Boxes (STBs) are used for selecting among channels on a network, such as, for example, a cable network (e.g., an optical fiber network), to enable content transmitted on those channels to be displayed on display devices (e.g., televisions) connected to the STBs. The STB user may use a remote device to switch channels on the STB, or to provide input for controlling other functions on the STB. The remote device may be used, for example, for controlling the STB's digital video recorder (DVR), for accessing a digital television programming guide, or for turning on or off specific settings on the STBs (e.g., turning on closed captioning, setting display width, etc.). The STB's DVR may include functionality for scheduling the recurring recording of a series of television programming. Therefore, the STB's DVR may permit a device user to schedule the weekly recording of the episodes of each of the user's favorite television series.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein retrieve previously aired episodes of television series from a Video-On-Demand (VOD) server(s) and/or a video repository based on the scheduling of the recurring recording of those series at a device, such as, for example, a STB having a DVR. When a device user, such as a STB user, schedules a given TV series for recurring recording by the DVR (e.g., weekly recording), implementations described herein automatically retrieve previously aired episodes of the given TV series from a Video-On-Demand server(s) and/or another video repository and store the previously aired episodes at the device for future viewing by the device user. Therefore, the device user has the option to view new episodes of the scheduled series that have been recorded by the DVR, and previously aired episodes of the series that weren't recorded by the DVR but were retrieved from the VOD server(s) and/or other video repository that are external to the device (e.g., the STB).

Figure 1:
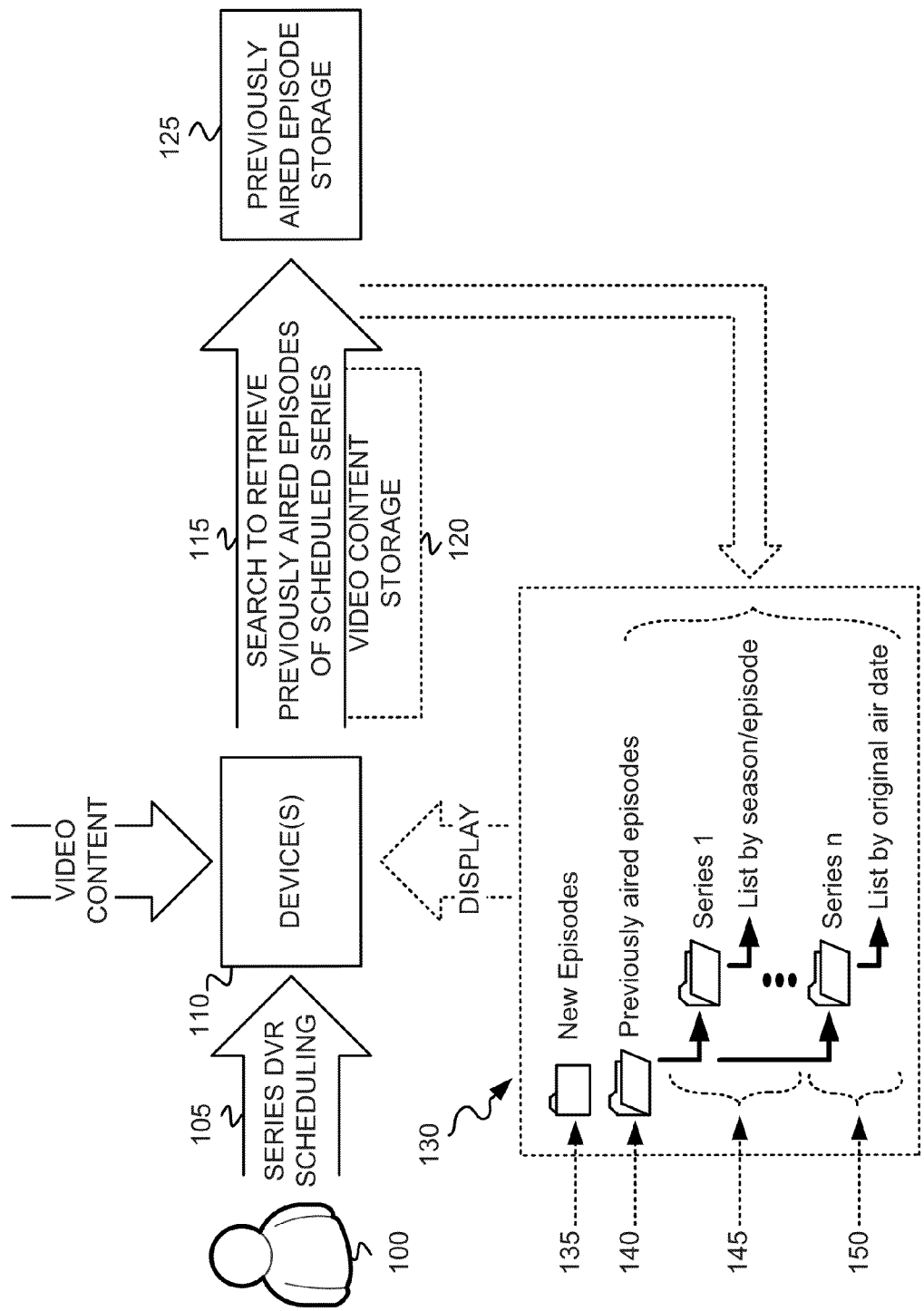
FIG. 1 is a diagram that depicts an overview of the retrieval of previously aired episodes based on the scheduling of the recording of a television series.

FIG. 1 is a diagram that depicts an overview of the retrieval of previously aired episodes based on the scheduling of the recording of a television series. As shown in FIG. 1, a device user 100 may schedule 105 a television series for digital video recording via a device(s) 110. Device (s) 110 may include one or more devices that may be used for scheduling the recording of a television series, such as, for example, a computer (e.g., desktop, laptop, palmtop or tablet computer), a Personal Digital Assistant (PDA), a cellular telephone (e.g., a smart phone), or a set-top box (STB) (e.g., connected to a television).

Scheduling 105 of the series recording may include device user 100 supplying an identification of a television series to automatically record on a continuous and recurring basis. Subsequent to series DVR scheduling 105, device 110 may search 115 video content storage 120 to retrieve previously aired episodes of the scheduled series. Video content storage 120 may include, for example, one or more Video-On-Demand (VOD) servers and/or other video repositories. The previously aired episodes of the scheduled series, retrieved from video content storage 120, may be stored in storage 125 that stores data associated with previously aired episodes of scheduled series.

Device user 100 may subsequently, using device(s) 110, display a list 130 of newly recorded episodes 135 and retrieved previously aired episodes 140. Newly recorded episodes 135 include episodes of one or more series that have been recorded based on device user 100's series DVR scheduling 105. Previously aired episodes 140 include episodes of series that, based on DVR scheduling of the series, have been retrieved from video content storage 120. As depicted in FIG. 1, list 130 may include a folder of new episodes 135 and a folder of previously aired episodes 140. As further shown in FIG. 1, previously aired episodes 140 may further be organized and listed in folder 135 by series, and by season and/or episode (shown as 145), or by series and by original air date of each episode of the series (shown as 150).

Figure 2:
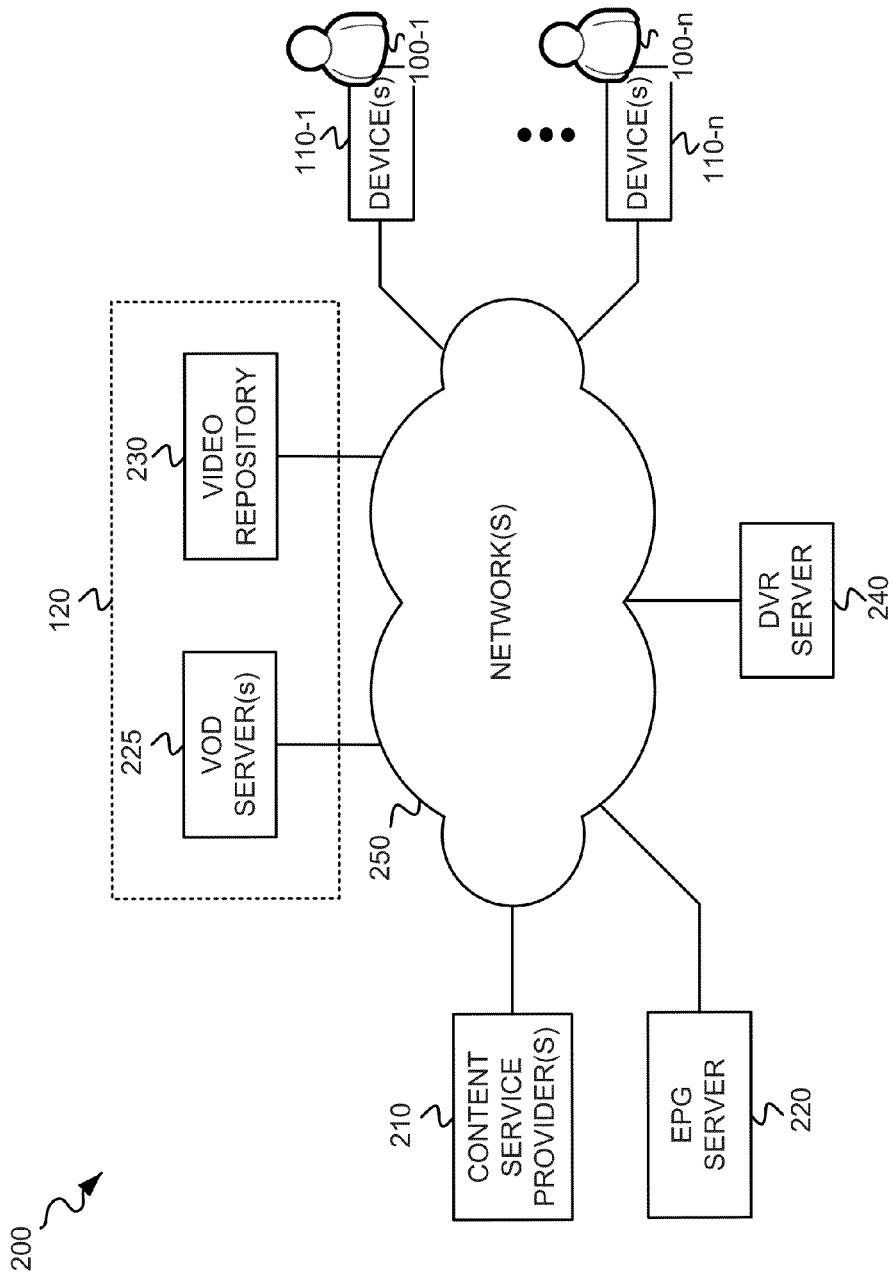
FIG. 2 is a diagram that depicts an exemplary network environment in which previously aired episodes of a series may be retrieved from video content storage based on the scheduling of the recording of the series at a device.

FIG. 2 is a diagram that depicts an exemplary network environment 200 in which previously aired episodes of a series may be retrieved from video content storage 120 based on the scheduling of the recording of the series at a device 110. Network environment 200 may include a content service provider(s) 210, an Electronic Program Guide (EPG) server 220, video content storage 120 that further includes VOD server(s) 225 and video repository 230, DVR server 240, devices 110-1 through 110-n (generically and individually referred to herein as a "device 110") and network(s) 250.

Content service provider(s) 210 may include one or more devices, or a network of devices, that deliver content to devices 110-1 through 110-n. Content service provider(s) 210 may deliver the content to devices 110-1 through 110-n via one or more channels (e.g., Quadrature Amplitude Module (QAM) channels) over network(s) 250. The content may include, for example television video programs.

EPG server 220 may deliver electronic program guide (EPG) data that includes various data related to the display of an electronic program guide at devices 110-1 through 110-n via network 250. An "electronic program guide," as referred to herein, includes menus of television program scheduling information that are shown by a content service provider (e.g., cable or satellite TV provider) to its viewers and that displays current and upcoming television programming. An EPG permits viewers to navigate through scheduling information interactively, selecting and discovering TV programming by time, station, or title. EPGs enable the viewer to identify desired programming using interactive menus and, if DVR functionality is present in the viewer's system, may permit the viewer to schedule the recording of desired programming via the EPG.

VOD server(s) 225 may include a network device that stores video content, such as, for example, previously aired television episodes and/or movies, that may be accessed in an on-demand fashion by devices 110-1 through 110-n or by DVR server 240. VOD server(s) 225 may be operated by content service provider(s) 210 in conjunction with provider 210's provision of content over network 250. Video repository 230 may include a network device(s) that also stores video content, such as, for example, previously aired television episodes and/or movies that may be accessed by devices 110-1 through 110-n or by DVR server 240. Video repository 230 may be operated by a third-party operator. DVR server 240 may include a network device that permits device users 100-1 through 100-n to schedule the recording of television series (and other content) and to retrieve previously aired episodes from VOD server(s) 225 and video repository 230.

Devices 110-1 through 110-n may each include a device that can receive content from content service provider(s) 210 via network 250, receive previously aired episodes retrieved from video content storage 120, and/or schedule the recurring recording of TV series from video programming received from content service provider(s) 210. Devices 110-1 through 110-n may each include a computer (e.g., desktop, laptop, palmtop or tablet computer), a PDA, a cellular telephone (e.g., a smart phone), or a STB (e.g., connected to a television).

Network(s) 250 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, and/or the Internet. Network(s) 250 may, in some implementations, include one or more QAM channels (or other types of modulated or broadcast channels) for delivering media and EPG data to devices 110-1 through 110-n.

The configuration of network components of network environment 200 illustrated in FIG. 2 is for illustrative purposes only. Other configurations may be implemented. Network environment 200 may include additional, fewer and/or different components than those depicted in FIG. 2.

Figure 3B:
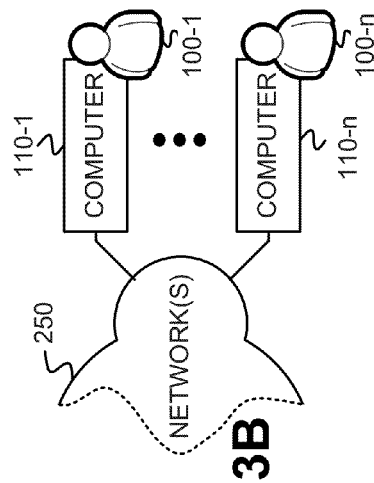
FIGS. 3A-3C depict exemplary implementations of the network environment of FIG. 2 where the devices include different types of communication devices.
Figure 3A:
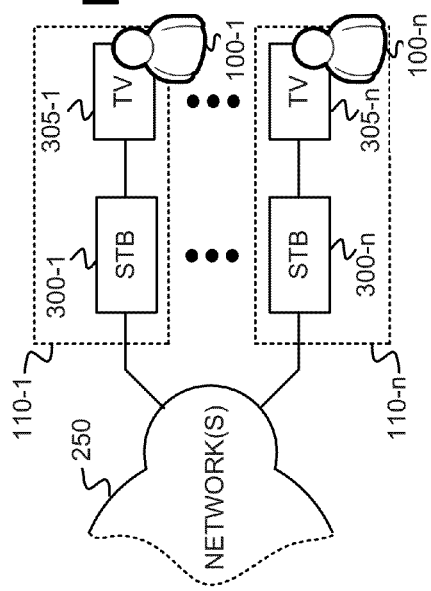
Figure 3C:
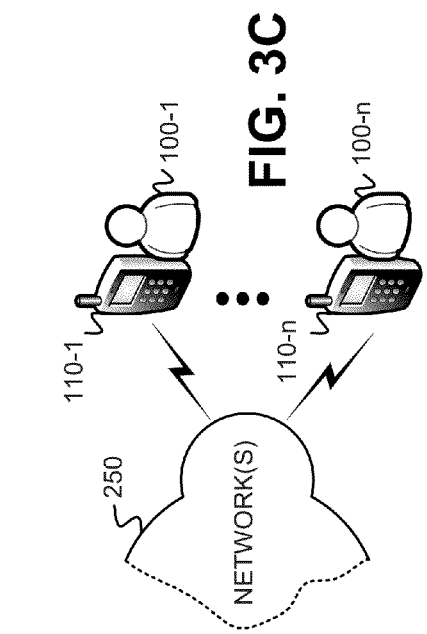

FIGS. 3A-3C depict exemplary implementations of network environment 200 of FIG. 2 where devices 110 include different types of devices. For example, as shown in the exemplary implementation of FIG. 3A, each device 110 includes a STB 300 and an associated television (TV) 305. In this implementation, device user 100 may interact with STB 300 and TV 305 via a remote control device (not shown) to schedule the recording of television series. STB 300 may include a device that, among other components, includes a tuner and connects to TV 305. STB 300 may receive an external source of signal (e.g., content from content service provider(s) 210 via network(s) 250) and may turn the signal into content that is displayed on TV 305, or another type of display device.

In another exemplary implementation shown in FIG. 3B, each device 110 includes a computer (e.g., a desktop or laptop computer having a wired connection to network 250). In this implementation, device user 100 may interact with computer 110 to schedule the recording of television series by computer 110 or by DVR server 240. In a further exemplary implementation shown in FIG. 3C, each device 110 includes a PDA, a cellular telephone, or a computer (e.g., a palmtop, laptop, or tablet computer having a wireless connection to network 250). In this implementation, each device user 100 may interact with device 110 to schedule the recording of television series by computer 110 or by DVR server 240.

Figure 4:
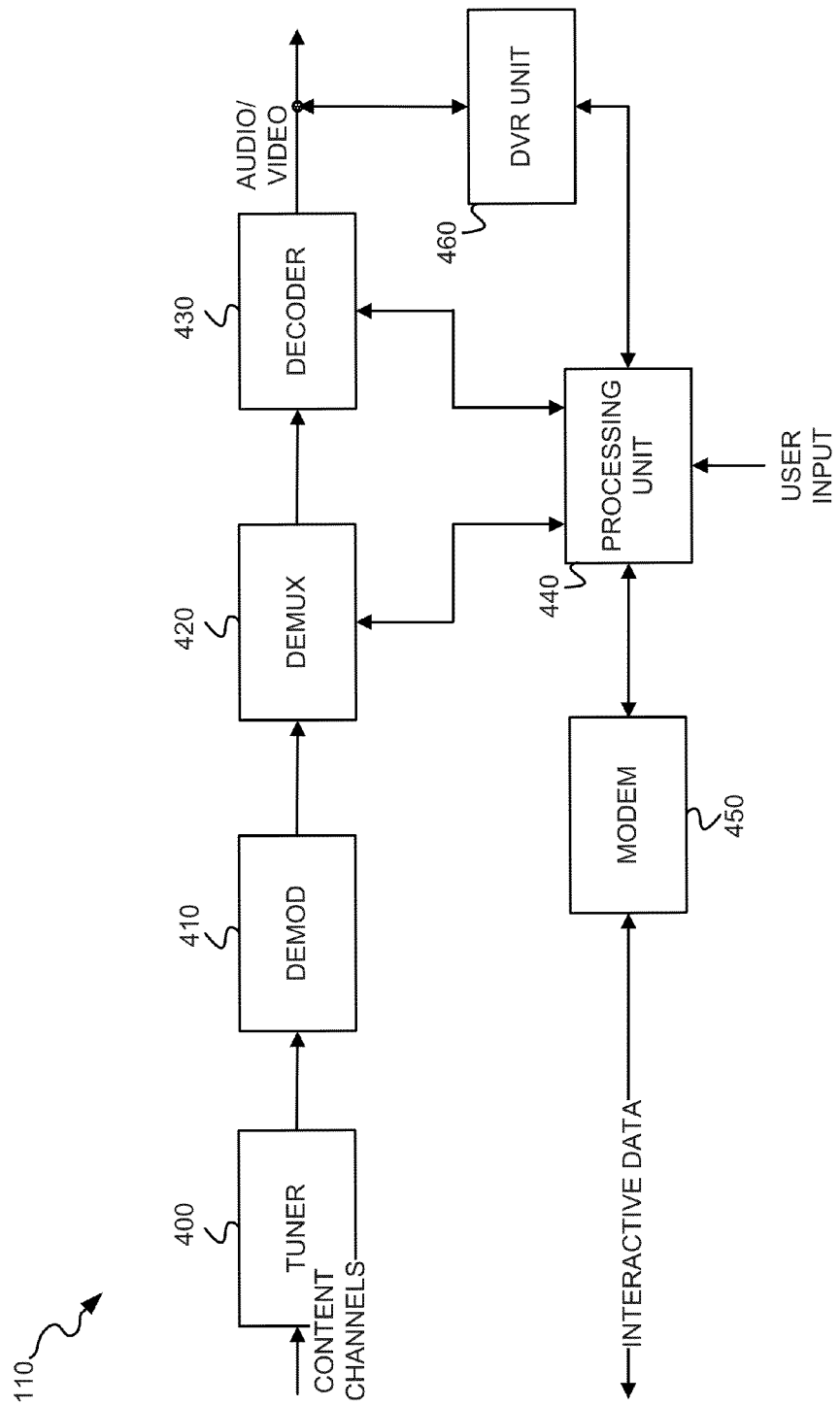
FIG. 4 depicts exemplary components of the device of FIG. 1, where the device is implemented as a set-top box.

FIG. 4 depicts exemplary components of device 110, where device 110 is implemented as STB 300. Device 110 may include a tuner 400, a demodulator 410, a demultiplexer 420, a decoder 430, a processing unit 440, a modem 450, and a DVR unit 450. Tuner 400 may select and tune to specific broadcast television information by tuning to one of many different input channels. Each channel may be digitally modulated using, for example, QAM, though other types of modulation may be used. Demodulator 410 may demodulate the information in the channel selected by tuner 400 to produce a transport stream (e.g., MPEG-2 or MPEG-4 transport stream) containing the audio, video and/or other information related to the selected TV program.

Demultiplexer 420 may select and decrypt compressed audio and video from the transport stream for the particular TV program that the device user wishes to watch. Decoder 430 may decode and decompress the decrypted audio and video information for the selected TV program. Processing unit 440 may include, for example, a microprocessor that controls the operations performed by tuner 400, demodulator 410, demultiplexer 420, decoder 430, modem 450 and DVR unit 460 based on user input (e.g., input received from a device user 100 via a remote control device). Modem 450 may send and receive interactive data (e.g., digital program guide information) that may be processed by processing unit 440. DVR unit 460 may digitally record, and store, audio and video content associated with the particular TV program decoded by decoder 430.

The configuration of components of device 110 in FIG. 4 is for illustrative purposes only. Other configurations may be implemented. Device 110 may include additional, fewer and/or different components than those depicted in FIG. 4.

Figure 5:
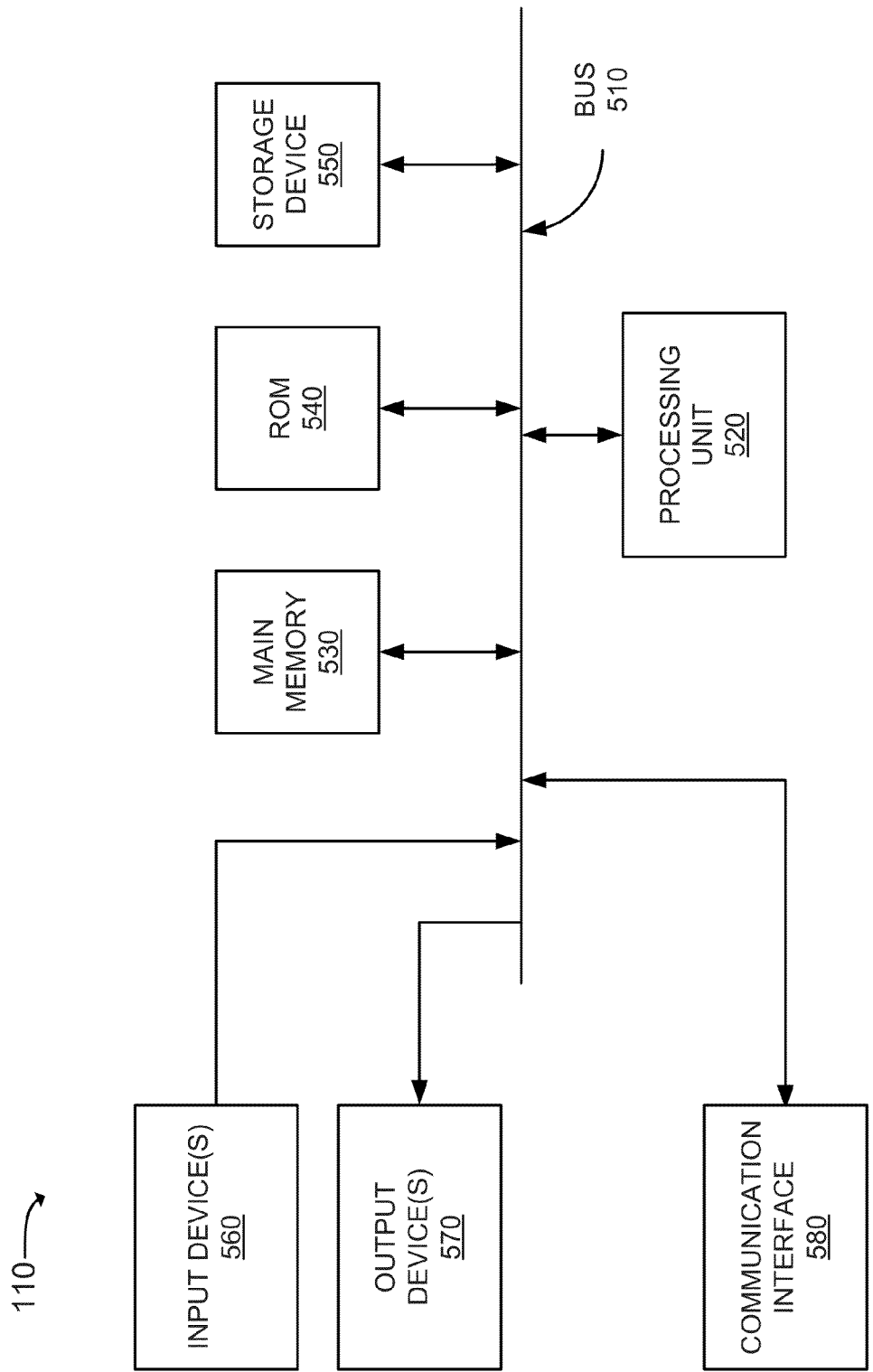
FIG. 5 is a diagram of exemplary components of the device of FIG. 1, where the device is implemented as a computer, a Personal Digital Assistant (PDA), or a cellular telephone.

FIG. 5 is a diagram of exemplary components of device 110, where device 110 is implemented as a computer (e.g., desktop, laptop, palmtop or tablet computer), a Personal Digital Assistant (PDA), or a cellular telephone (e.g., a smart phone). DVR server 240, EPG server 220, VOD server(s) 225, and video repository 230 may be similarly configured. Device 110 may include a bus 510, a processing unit 520, a main memory 530, a read only memory (ROM) 540, a storage device 550, an input device(s) 560, an output device(s) 570, and a communication interface 580. Bus 510 may include a path that permits communication among the elements of device 110.

Processing unit 520 may include one or more processors or microprocessors, or processing logic, which interprets and executes instructions. Main memory 530 may include a random access memory (RAM) or another type of dynamic storage device that stores information and instructions for execution by processing unit 520. ROM 540 may include a ROM device or another type of static storage device that stores static information and instructions for use by processing unit 520. Storage device 550 may include a magnetic and/or optical recording medium. Main memory 530, ROM 540, and storage device 550 may each be referred to herein as a "tangible non-transient computer-readable medium."

Input device 560 may include one or more mechanisms that permit device user 100 to input information to device 110, such as, for example, a keypad or a keyboard, a display with a touch sensitive panel, voice recognition and/or biometric mechanisms, etc. Output device 570 may include one or more mechanisms that output information to device user 100, including a display, a speaker, etc. Communication interface 580 may include any type of transceiver that enables device 110 to communicate with other devices and/or systems. For example, communication interface 580 may include wired or wireless transceivers for communicating via network(s) 250.

The configuration of components of device 110 in FIG. 5 is for illustrative purposes only. Other configurations may be implemented. Device 110 may include additional, fewer and/or different components than those depicted in FIG. 5.

Figure 6:
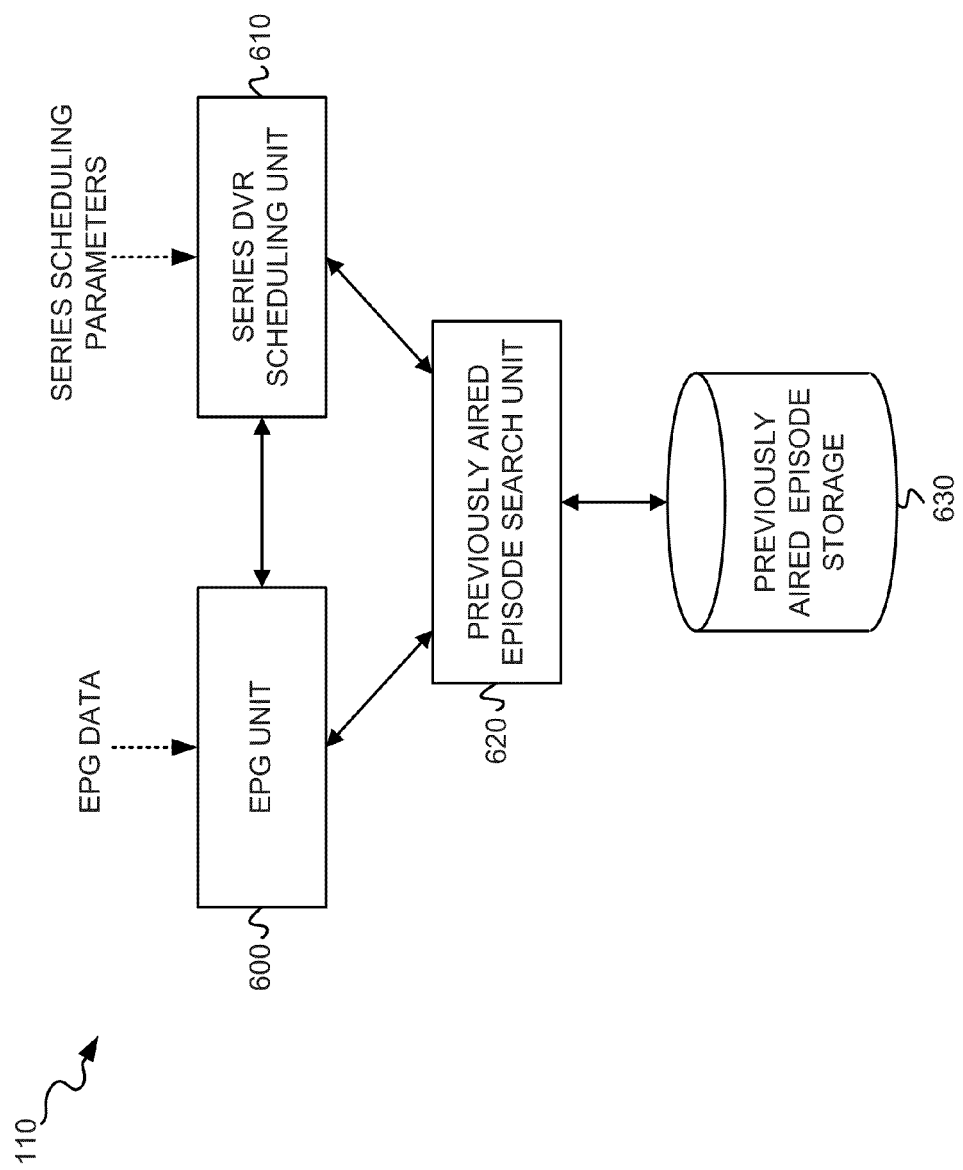
FIG. 6 is a diagram of exemplary functional components of the device of FIG. 1.

FIG. 6 is a diagram of exemplary functional components of device 110. In an implementation in which DVR server 240 performs the scheduling of the recording of series programming, then DVR server 240 may include functional components that are the same as, or are similar to, those shown in FIG. 6. The functional components shown in FIG. 6 may be implemented in hardware and/or software within device 110. For example, in one implementation, the functional components of FIG. 6 may be implemented as instructions stored in memory 530 that are executed by processing unit 520. The functional components of device 110 may include an EPG unit 600, a series DVR scheduling unit 610, a previously aired episode search unit 620, and previously aired episode storage 630.

EPG unit 600 may receive EPG data from EPG server 220 and may provide television program scheduling data to series DVR scheduling unit 610 and to previously aired episode search unit 620. Series DVR scheduling unit 610 may process the television program scheduling data, in conjunction with series scheduling parameters received from device user 100, to schedule the future recording of a television program series. The series scheduling parameters may include, among other parameters, an identification of the series being scheduled. The future recording of the series may include recording of the series on a recurring and/or periodic basis (e.g., weekly). Unit 610 may provide the identification of the series scheduled to be recorded to previously aired episode search unit 620, which may perform a search of series episodes stored on VOD server(s) 225 and/or video repository 230. Search unit 620 may, for example, perform a text search of video content stored on VOD server(s) 225 and/or video repository 230 to locate episodes of series whose titles match the identification of the series scheduled to be recorded. Search unit 620 may retrieve the located episodes having matching titles, or data associated with the located episodes having matching titles, and may store the episodes, or data associated with the episodes, in storage 630. Previously aired episode storage 630 may store the episodes, or the data associated with the episodes, for future retrieval when device user 100 decides to view the previously aired episodes retrieved from VOD server(s) 225 and/or video repository 230.

Figure 7:
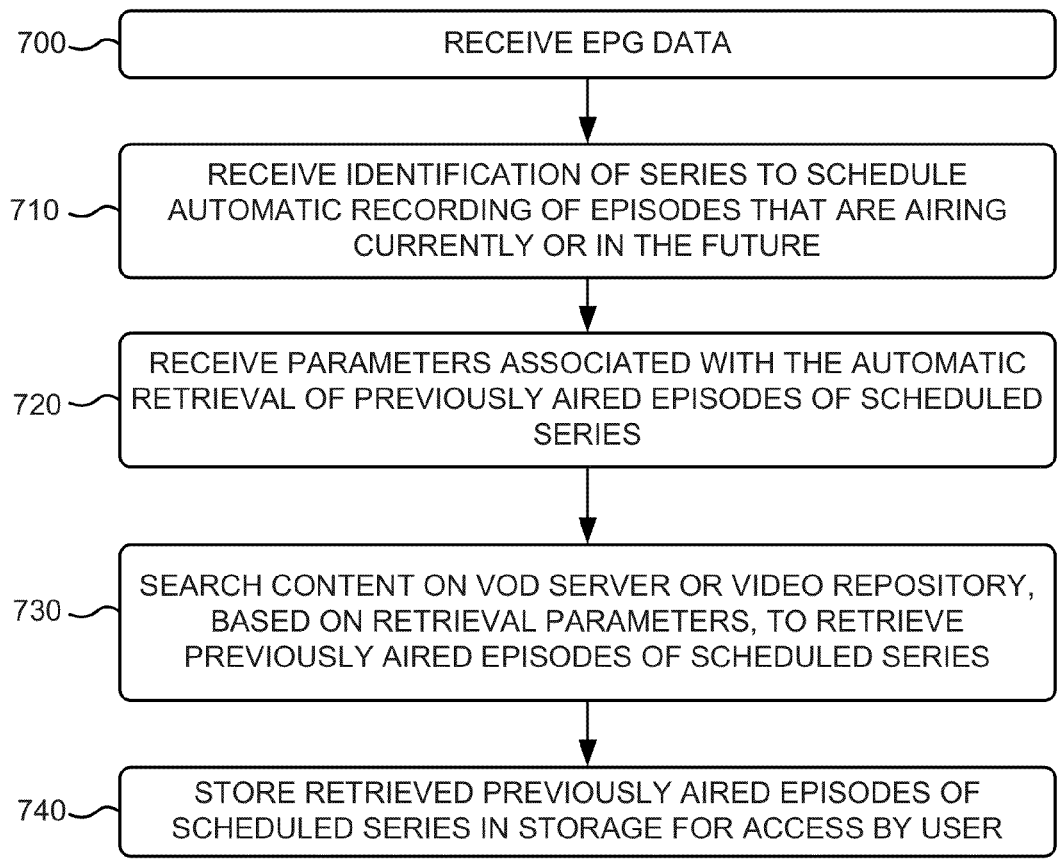
FIG. 7 is a flow diagram that illustrates an exemplary process for retrieving data associated with previously aired episodes of a series from video content storage based on the scheduling of the recording of the series.

FIG. 7 is a flow diagram that illustrates an exemplary process for retrieving data associated with previously aired episodes of a series from video content storage 120 based on the scheduling of the recording of the series. The exemplary process of FIG. 7 may be implemented by device 110 and/or DVR server 240. The exemplary process of FIG. 7 is described below with respect to the example messaging diagram of FIG. 8 and the exemplary TV programming scheduling interface of FIGS. 9A and 9B.

Figure 8:
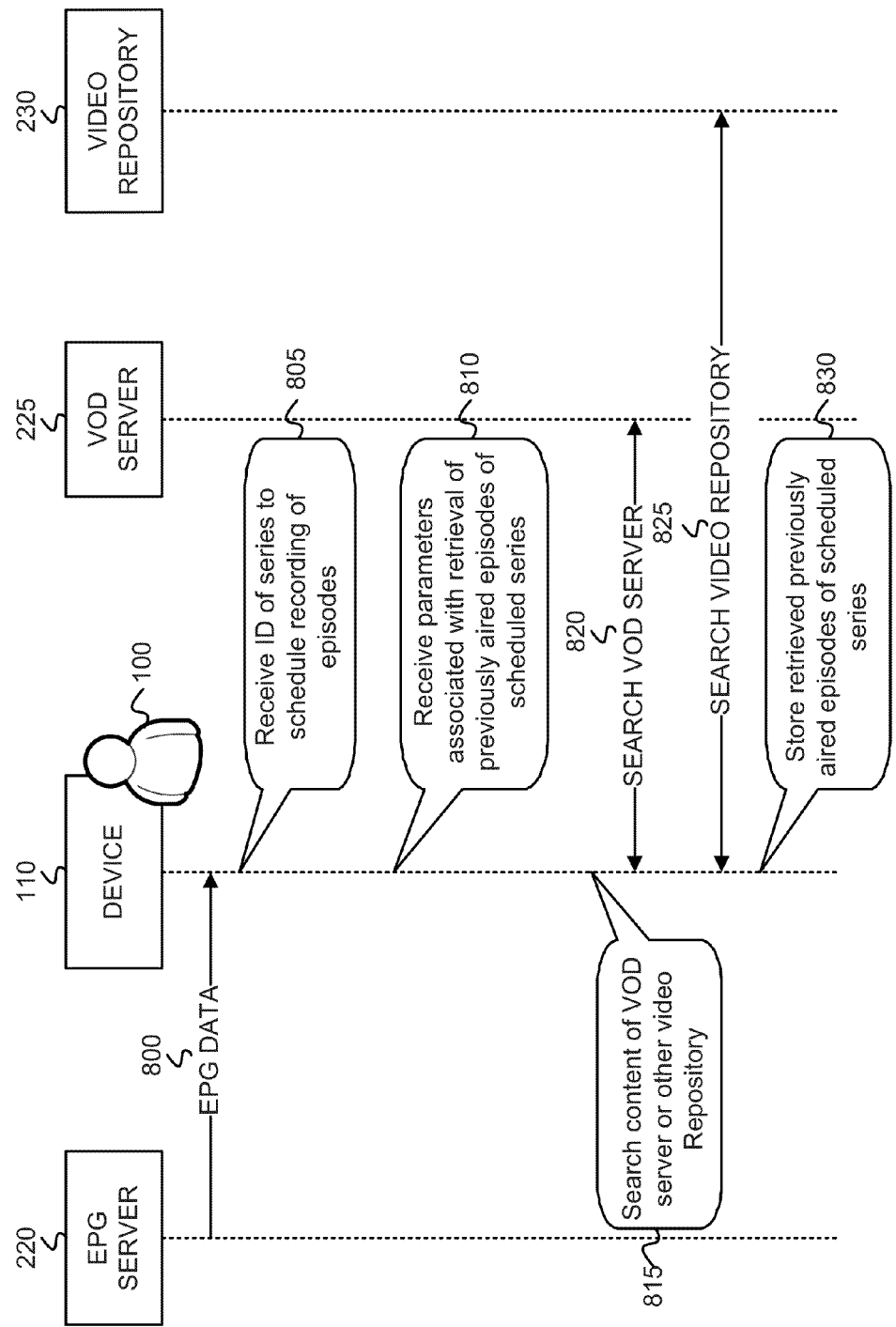
FIG. 8 is a messaging diagram associated with the exemplary process of FIG. 7.

The exemplary process may include receiving EPG data (block 700). As shown in FIG. 8, device(s) 110 may receive EPG data 800 from EPG server 220. EPG data 800 may include television programming scheduling information, including TV programming scheduling information for each channel received at device(s) 110. The TV programming scheduling information may further include an identification of TV programs, dates and times at which the TV programs will air, and a description of each of the TV programs.

Figure 9A:
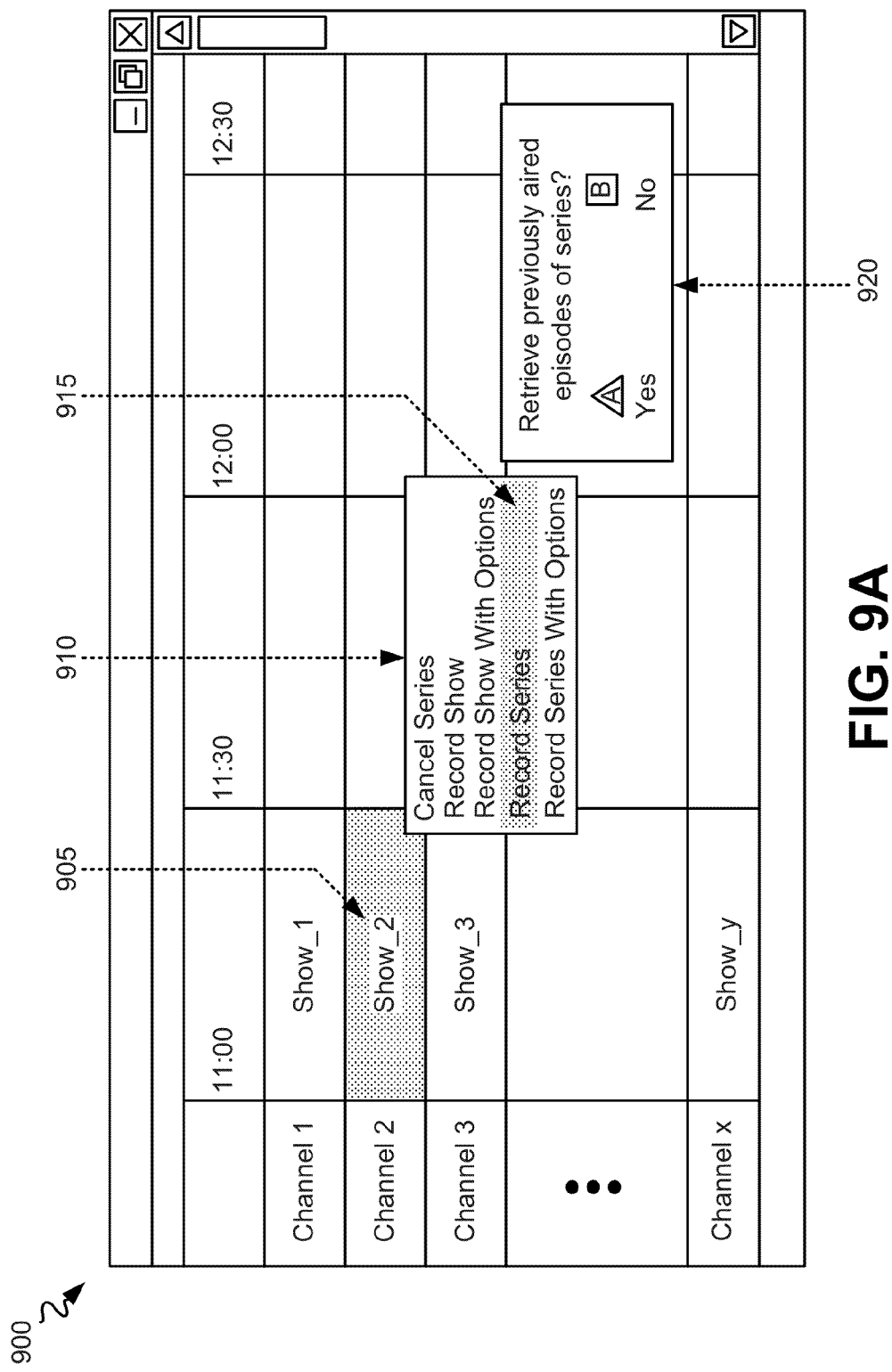
FIGS. 9A and 9B are diagrams that depict an exemplary television programming schedule interface that may be used in conjunction with the exemplary process of FIG. 7.

Device 110 may receive an identification of a series to schedule the automatic recording of episodes of the series that are airing currently or in the future (block 710). Device user 100 at device(s) 110 may identify the series to schedule the automatic recording of episodes by, for example, manually entering a title of the series. In other implementations, device user 100 may identify the series by selecting the series from a TV programming schedule presented to device user 100 via device(s) 110. FIG. 8 depicts device 110 receiving 805 an ID of the series to schedule the recording of episodes. FIG. 9A shows a specific example of the selection of a series from a TV programming scheduling interface 900 presented to device user 100. As shown in FIG. 9A, a specific TV program 905 on scheduling interface 900 may be selected (shown highlighted), and device user 100 may select from a number of series recording choices displayed in a menu 910. For example, as depicted in FIG. 9A, "record series" 915 may be selected from menu 910 to record "show_2" selected from TV programming scheduling interface 900.

Figure 9B:
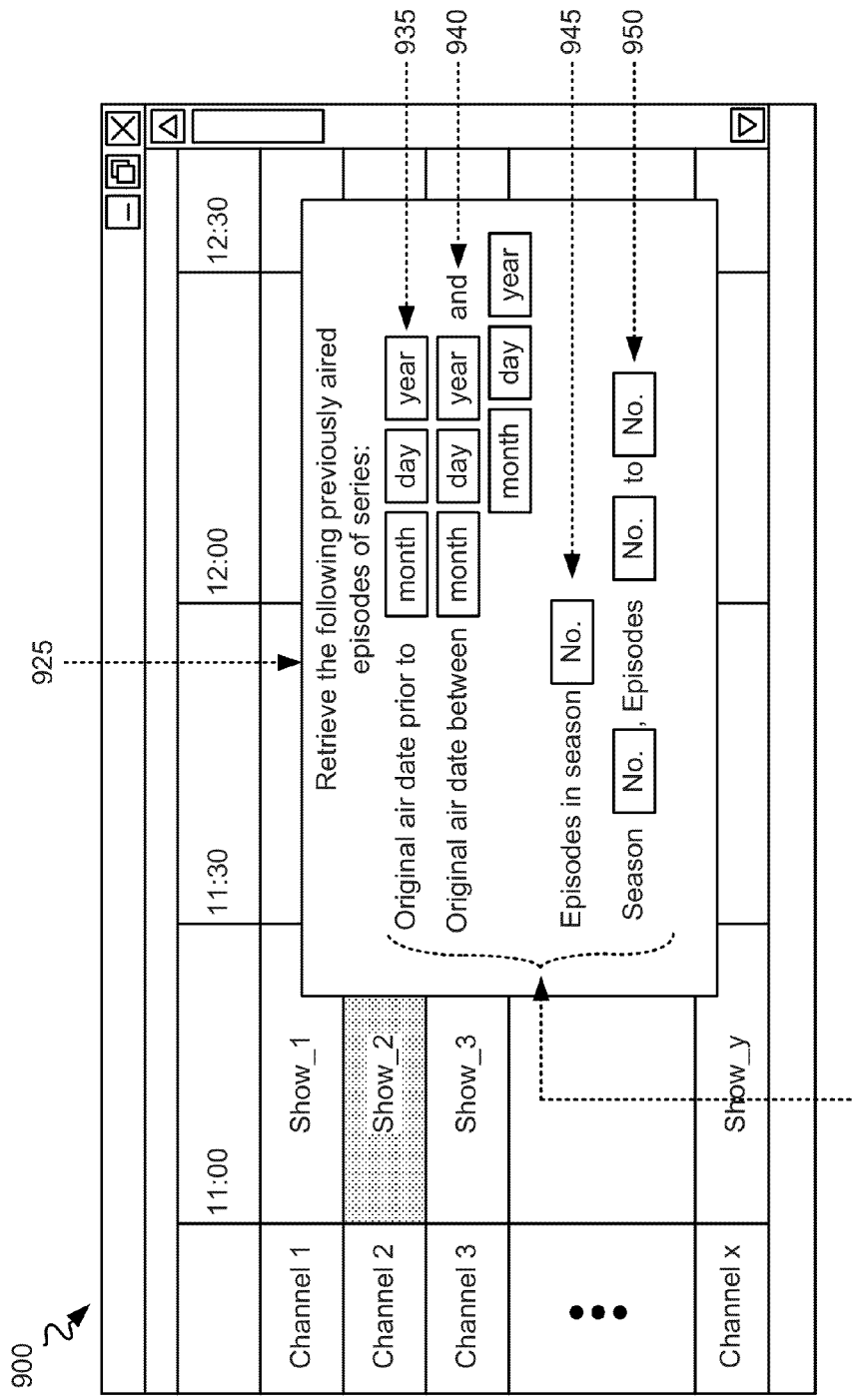

Device 110 may receive parameters associated with the automatic retrieval of previously aired episodes of scheduled series (block 720). Subsequent to identification of the series to schedule recording, as described above with respect to FIG. 9A, a window 920 may be displayed, after selection of "record series" 915 from menu 910, to give device user 110 the option to retrieve previously aired episodes of the series from VOD server(s) 225 and/or video repository 230. For example, as shown in FIG. 9A, window 920 may enable device user 100 to select either "yes" or "no" in response to the question "Retrieve previously aired episodes of series?" If device user 100 selects "yes" from window 920, then, as depicted in FIG. 9B, another window 925 may be presented to device user 100 to enable device user 100 to enter parameters 930 associated with the automatic retrieval of previously aired episodes of the scheduled series. Parameters 930 may include an identification of a date 935 (e.g., month, day, year) prior to which episodes of the scheduled series may be retrieved. Therefore, previously aired episodes of the series having original air dates prior to the identified date may be retrieved from VOD server(s) 225 or video repository 230. Parameters 930 may further include a date range 940 that identifies a beginning date (e.g., month, day, year) and an ending date (e.g., month, day, year) within which episodes of the scheduled series may be retrieved. Therefore, previously aired episodes of the series having original air dates within the date range may be retrieved from VOD server(s) 225 or video repository 230. Parameters 930 may additionally include an identification of a season number 945. Previously aired episodes of the series that aired during the identified season number may be retrieved from VOD server(s) 225 or video repository 230. Parameters 930 may also include an identification of a season number and range of episodes 950. Therefore, previously aired episodes of the series that aired during the identified season number, and are episodes numbered within the range of episodes 950 may be retrieved from VOD server(s) 225 or video repository 230. FIG. 8 depicts device 110 receiving 810 parameters associated with the retrieval of previously aired episodes of the scheduled series.

Device 110 may search content on VOD server 225 or video repository 230, based on the retrieval parameters received in block 720, to retrieve previously aired episodes of the scheduled series from VOD server(s) 225 and/or video repository 230 (block 730). FIG. 8 depicts device 110 searching 815 content of VOD server 225 and video repository 230 via searching message streams 820 and 825. VOD server(s) 225 and video repository 230 may return data associated with previously aired episodes that match the search parameters via searching message streams 820 and 825. Device 110 may store data associated with the retrieved previously aired episodes of the scheduled series in storage for access by device user 100 (block 740). Device 110 may receive the retrieved previously aired episodes of the scheduled series, or data associated with the previously aired episodes of the scheduled series, from VOD server(s) 225 and/or video repository 230, and may store the episodes or the data associated with the episodes for future retrieval. FIG. 8 depicts device 110 storing 830 the retrieved previously aired episodes of the scheduled series.

Figure 10:
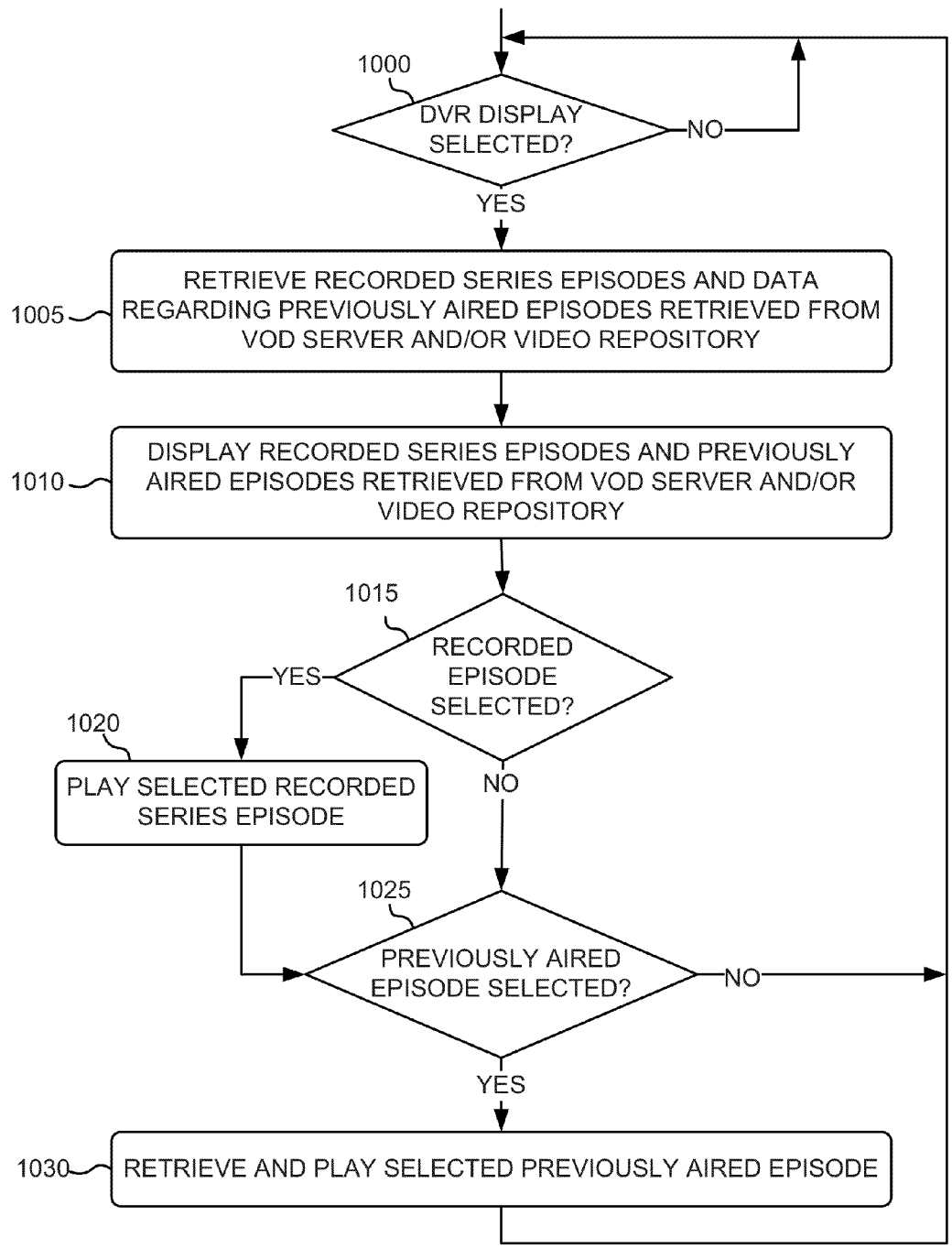
FIG. 10 is a flow diagram that illustrates an exemplary process for accessing, at the device of FIG. 1, previously aired series episodes retrieved from the VOD server(s) and/or video repository of FIG. 2.

FIG. 10 is a flow diagram that illustrates an exemplary process for accessing, at device 110, previously aired series episodes retrieved from VOD server(s) 225 and/or VOD repository 230. The exemplary process of FIG. 10 may be implemented by device 110 and/or DVR server 240.

Figure 11:
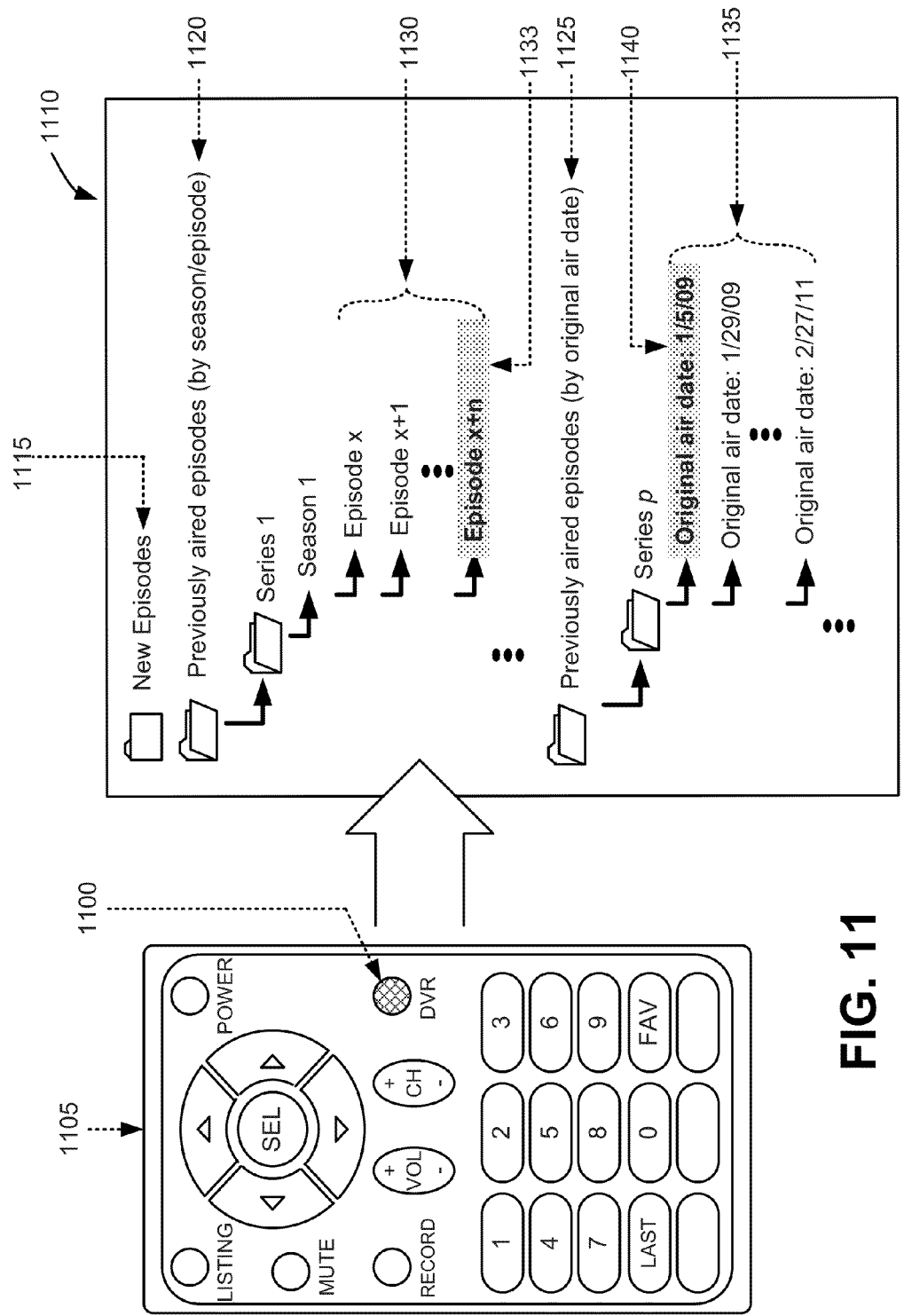
FIG. 11 is a diagram that depicts a display of recorded series episodes and previously aired episodes of a series retrieved from the VOD server(s) and/or the video repository of FIG. 2.

The exemplary process may include determining whether the DVR display has been selected (block 1000). As depicted in FIG. 11, device user 100, at device 110, may use a DVR button 1100 to select DVR functionality via a user interface 1105. In one implementation, user interface 1105 may be implemented as part of a remote control device that permits user input to a STB 300. In another implementation, user interface 1105 may be implemented as a graphical user interface on a smartphone, a PDA, or a computer (e.g., laptop, desktop, palmtop or tablet computer). To select the DVR functionality, device user 100 may press DVR button 1105 to cause the display of DVR display 1110.

Device 110 may retrieve recorded series episodes and data regarding previously aired episodes retrieved from VOD server(s) 225 and/or video repository 230 (block 1005) and display the retrieved recorded series episodes and the previously aired episodes retrieved from VOD server(s) 225 and/or video repository 230 (block 1010). Device 110 may retrieve the recorded series episodes and the data regarding previously aired episodes from storage 630 for display. FIG. 11 depicts the display of the recorded series episodes (shown as "new episodes" 1115) and the previously aired episodes 1120 and 1125. Previously aired episodes 1120 shown in FIG. 11 include previously aired episodes retrieved from VOD server(s) 225 and/or video repository 230 that are listed by season and/or episode (shown as 1130 in FIG. 11). Previously aired episodes 1120 shown in FIG. 11 include previously aired episodes retrieved from VOD server(s) 225 and/or video repository 230 that are listed by original air date (shown as 1135 in FIG. 11).

Device 110 may determine whether a recorded episode has been selected (block 1015). If a recorded episode has been selected (YES—block 1015), then device 110 may play the selected recorded series episode (block 1020). Referring to the example of FIG. 11, device user 100 may select a recorded episode from "new episodes" folder 1115. If a recorded episode has not been selected (NO—block 1015), then device 110 may determine if a previously aired episode has been selected (block 1025). Referring again to the example of FIG. 11, device user 100 may select episode "x+n" from the list 1130 of previously aired episodes listed by season and/or episode. As further shown in FIG. 11, device user 100 may select the episode having an original air date of "Jan. 5, 2009" from the list 1135 of previously aired episodes that are listed by original air date. If a previously aired episode has not been selected (NO—block 1025), then the exemplary process may return to block 1000. If a previously aired episode has been selected (YES—block 1025), then device 110 may retrieve and play the selected previously aired episode (block 1030). For example, if device 110 is a STB 300, then STB 300 may retrieve the selected previously aired episode from VOD server 225, and may play the episode on TV 305.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 7 and 10, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from a user at a device, an identification of a series;
   receiving, from the user via a user interface at the device, a first instruction to schedule automatic recording of episodes of the series, that are currently airing or that will be airing in the future, as scheduled series;
   receiving, from the user via the user interface at the device, a second instruction to automatically retrieve previously aired episodes of the scheduled series based on the scheduling of the automatic recording of the episodes that are currently airing or that will be airing in the future, wherein the second instruction is distinct from, and received subsequent to, the first instruction;
   receiving parameters associated with the automatic retrieval of the previously aired episodes of the series, wherein the parameters include a single first date, comprising a first month, a first day and a first year, to specify retrieval of all episodes of the series that aired on any second date, comprising a second month, a second day and a second year that occurred prior to the single first date;

searching content, based on receipt of the second instruction, on a Video-On-Demand (VOD) server or other video repository to retrieve previously aired episodes of the scheduled series stored at the VOD server or the other video repository that match the received parameters;

recording, based on receipt of the first instruction, at least one episode of the scheduled series; and presenting the recorded at least one episode of the scheduled series and the previously aired episodes of the scheduled series such that a user may select and play the at least one episode of the scheduled series or the previously aired episodes of the scheduled series, wherein presenting the previously aired episodes of the scheduled series comprises:

listing the previously aired episodes of the scheduled series by a season number or by an episode number associated with each of the previously aired episodes; or listing the previously aired episodes of the scheduled series by an original air date of each of the previously aired episodes.

2. The method of claim 1, further comprising:

receiving an episode selection from the at least one episode of the scheduled series or from the previously aired episodes of the scheduled series; and playing the selected episode.

3. A tangible, non-transitory computer-readable medium containing instructions executable by at least one processing unit, the computer-readable medium, comprising:

one or more instructions for identifying a television series for which to schedule automatic recording of episodes, that are currently airing or that will be airing in the future, as a scheduled series;

one or more instructions for receiving parameters associated with an automatic retrieval of previously aired episodes of the scheduled series, wherein the parameters include a single first date, comprising a first month, a first day and a first year, to specify retrieval of all episodes of the scheduled series that aired on any second date, comprising a second month, a second day and a second year, that occurred prior to the single first date; and one or more instructions for searching content on a Video-On-Demand (VOD) server or other video repository to retrieve the previously aired episodes of the scheduled series, stored at the VOD server or the other video repository, that match the received parameters; and one or more instructions for presenting at least one recorded episode of the scheduled series and the retrieved previously aired episodes of the scheduled series to a user for playback, wherein the one or more instructions for presenting the retrieved previously aired episodes of the scheduled series comprises:

one or more instructions for listing the retrieved previously aired episodes of the scheduled series by a season number or by an episode number associated with each of the retrieved previously aired episodes; or one or more instructions for listing the retrieved previously aired episodes of the scheduled series by an original air date of each of the retrieved previously aired episodes.

4. The tangible, non-transitory computer-readable medium of claim 3, further comprising:

one or more instructions for receiving an instruction to automatically retrieve previously aired episodes of the scheduled series based on the scheduling of the automatic recording of the episodes that are currently airing or that will be airing in the future.

5. The tangible, non-transitory computer-readable medium of claim 3, further comprising:

one or more instructions for receiving an episode selection from the recorded at least one episode of the scheduled series or from the previously aired episodes of the scheduled series; and one or more instructions for playing the selected episode.

6. A set-top box, comprising:

an electronic programming guide (EPG) unit configured to receive data associated with an EPG;

a television series scheduling unit configured to:

receive an identification of a television series to schedule automatic recording of episodes, that are currently airing or that will be airing in the future, as a scheduled series, and receive an instruction to automatically retrieve previously aired episodes of the scheduled television series based on the scheduling of the automatic recording of the episodes that are currently airing or that will be airing in the future;

a search unit configured to search content, based on receipt of the instruction, on a Video-On-Demand (VOD) server or other video repository to retrieve previously aired episodes of the scheduled television series stored at the VOD server or the other video repository;

a storage unit configured to store the retrieved previously aired episodes of the scheduled series; and a digital video recorder (DVR), further comprising:

a DVR unit configured to:

record at least one episode of the scheduled series as the at least one episode airs;

present, via a DVR user interface, a first folder that stores, organizes and displays the at least one episode of the scheduled series recorded by the DVR unit; and present, via the DVR user interface simultaneously with the first folder, a second, different folder that stores, organizes and displays the previously aired episodes of the scheduled series retrieved from the VOD server or other video repository, wherein the DVR unit is further configured to enable a user to navigate through the first folder to select and play the at least one episode of the scheduled series or navigate through the second folder to select and play the previously aired episodes of the scheduled series, and wherein, when presenting the second, different folder simultaneously with the first folder via the DVR user interface, the DVR unit is further configured to:

list the previously aired episodes of the scheduled series in the second folder by a season number or by an episode number associated with each of the previously aired episodes, or list the previously aired episodes of the scheduled series in the second folder by an original air date of each of the previously aired episodes.

7. The set-top box of claim 6, wherein the DVR unit is further configured to:

receive an episode selection from the at least one episode of the scheduled series from the first folder or from the previously aired episodes of the scheduled series from the second folder, and play the selected episode.

8. The set-top box of claim 6, wherein the television series scheduling unit is further configured to:

receive parameters associated with the automatic retrieval of the previously aired episodes of the scheduled series, wherein the parameters include a single date to specify retrieval of episodes of the scheduled series that aired prior to the single date.

\* \* \* \* \*